(12) United States Patent
Chun et al.

(10) Patent No.: US 11,967,991 B2
(45) Date of Patent: Apr. 23, 2024

(54) DAS FOR MULTI-FREQUENCY BAND AND MULTI-CARRIER BASED ON O-RAN STANDARD

(71) Applicant: ADRF KOREA, Inc., Icheon-si (KR)

(72) Inventors: Chong Youn Chun, Seongnam-si (KR); Chan Ki Cho, Icheon-si (KR)

(73) Assignee: ADRF KOREA, Inc., Icheon-si Gyeonggi-do (KR)

( * ) Notice: Subject to any disclaimer, the term of this patent is extended or adjusted under 35 U.S.C. 154(b) by 0 days.

(21) Appl. No.: 18/143,702

(22) Filed: May 5, 2023

(65) Prior Publication Data

US 2023/0275663 A1    Aug. 31, 2023

Related U.S. Application Data

(62) Division of application No. 17/528,461, filed on Nov. 17, 2021, now Pat. No. 11,716,145.

(30) Foreign Application Priority Data

Sep. 1, 2021 (KR) .......................... 10-2021-0116402

(51) Int. Cl.
  *H04B 10/2575* (2013.01)
  *H04B 7/0413* (2017.01)

(52) U.S. Cl.
  CPC ..... *H04B 10/25759* (2013.01); *H04B 7/0413* (2013.01); *H04B 10/25753* (2013.01)

(58) Field of Classification Search
  CPC ................... H04B 10/25753; H04B 10/25759
  (Continued)

(56) References Cited

U.S. PATENT DOCUMENTS 10,701,755 B2   6/2020   Khan
10,834,729 B1   11/2020  Guri
  (Continued)

FOREIGN PATENT DOCUMENTS

KR   1020190135854 A   12/2019

OTHER PUBLICATIONS

Jordan: "Open RAN functional splits, explained", https://www.5gtechnologyworld.com/open-ran-functional-splits-explained/, Feb. 24, 2021 (Year: 2021).*

(Continued)

*Primary Examiner* — Li Liu
(74) *Attorney, Agent, or Firm* — Dinsmore & Shohl LLP; Yongsok Choi, Esq.

(57) ABSTRACT

A distributed antenna system (DAS) for multi-carrier and multi-frequency band based on an O-RAN standard in an open radio access network (O-RAN)-based mobile communication network is provided. The DAS includes an O-RAN remote unit (RU) connected to a fronthaul network according to an O-RAN split option specification of base station transceiver systems (BTSs), and comprising a plurality of O-RAN RUs to accommodate a plurality of carriers and a plurality of frequency bands, and a channel combiner to which outputs of the plurality of O-RAN RUs are combined. The channel combiner is an analog combiner. The DAS further includes an optical distribution unit (ODU) connected to the analog combiner, and a radio unit (RU) connected to the ODU. The RU includes an optical receiving unit (ORU), a high power amplifier (HPA), a low noise amplifier (LNA), and a duplexer or filter.

4 Claims, 6 Drawing Sheets

(58) Field of Classification Search
USPC .................................................. 398/115, 116
See application file for complete search history.

(56) References Cited

U.S. PATENT DOCUMENTS

| | | | |
|---|---|---|---|
| 2008/0219670 A1* | 9/2008 | Kim ................. | H04B 10/25758 |
| | | | 398/115 |
| 2019/0289497 A1 | 9/2019 | Rajagopal | |
| 2020/0252142 A1 | 8/2020 | Bedekar | |
| 2021/0006944 A1 | 1/2021 | Raghothaman et al. | |
| 2021/0057802 A1 | 2/2021 | Guri | |
| 2021/0409977 A1* | 12/2021 | Dussmann ............ | H04W 24/08 |
| 2022/0038126 A1 | 2/2022 | Kummetz et al. | |
| 2022/0052891 A1 | 2/2022 | Kulik | |
| 2022/0110098 A1 | 4/2022 | Mizrahi | |
| 2022/0264333 A1 | 8/2022 | Sandberg et al. | |
| 2022/0264525 A1 | 8/2022 | Simon et al. | |
| 2022/0286910 A1 | 9/2022 | Ramakrishnan et al. | |
| 2022/0338164 A1 | 10/2022 | Simon et al. | |
| 2022/0407556 A1 | 12/2022 | Braun et al. | |
| 2022/0417876 A1* | 12/2022 | Ranson ............... | H04W 56/001 |
| 2022/0418043 A1 | 12/2022 | Karkkainen et al. | |

OTHER PUBLICATIONS

Umesh et al: "Overview of O-RAN Fronthaul Specification", NTT Docomo Technical Journal, vol. 21 No. 1, Jul. 2019, pp. 46-59 (Year: 2019).*

Li et al: "Novel Digital and Analogue Hybrid Radio over Fibre System for Distributed Antenna System (DAS) Fronthaul Applications", CLEO 2020, paper JTu2E.5 (Year: 2020).*

Anil Umesh, et. al., "Overview of O-RAN Fronthaul Specifications", NTT Docomo Technical Journal, Jul. 1, 2019, vol. 21, No. 1, pp. 46-59.

Tongyun Li, et al., "Novel Digital and Analogue Hybrid Radio over Fibre System for Distributed Antenna System (DAS) Fronthaul Applications", Journal, Conference on Lasers and Electro-Optics (CLEO), May 2020, pp. 1-2.

Eugina Jordan, "Open RAN functional splits, explained", Online Article, Parallel Wireless, Feb. 14, 2021 https://www.5gtechnologyworld.com/open-ran-functional-splits-explained/.

* cited by examiner

DAS FOR MULTI-FREQUENCY BAND AND MULTI-CARRIER BASED ON O-RAN STANDARD

CROSS-REFERENCE TO RELATED APPLICATION

This application is a divisional application of U.S. patent application Ser. No. 17/528,461 filed on Nov. 17, 2021, which claims priority to Korean Patent Application No. 10-2021-0116402 filed on Sep. 1, 2021, the entire contents of which are herein incorporated by reference.

BACKGROUND

1. Field

The present disclosure relates to a distributed antenna system (DAS) for multi-frequency band and multi-carrier equipped with an open radio access network (O-RAN) remote unit (RU) according to an O-RAN technology standard for building a next-generation radio infrastructure.

2. Description of the Related Art

The open radio access network (O-RAN) standard empowered by principles of intelligence and openness is the foundation for building the virtualized RAN on open hardware and cloud with AI-powered radio control. The O-RAN standard was created to ensure a wide range of supplier community driven by innovation and open market competition and simultaneously accelerate the delivery of products that support common and open architecture and standardized interface that we, as carriers, regard as the foundation of next-generation radio infrastructure.

In building the next-generation radio infrastructure through the O-RAN standard, the O-RAN remote unit (RU) is developed as a RU for a specific frequency band or a specific carrier like the existing base station system, develops these products and supplies the products to a specific carrier.

However, in a market environment in which the radio infrastructure is to be built, it is necessary to simultaneously service multi-carrier and multi-frequency band. Therefore, distributed antenna system (DAS) equipment to accommodate multi-frequency band and multi-carrier is required.

FIG. 1 is a schematic block diagram of a conventional DAS. As shown in FIG. 1, a plurality of base station transceiver systems (BTS) 0 and 20 are respectively connected to POIs 30 and 40 by RF signals, and the RF signals of the POIs 30 and 40 are combined to multi-band by a channel combiner (CHC) 50. Then, the RF signal of the multi-band is distributed to radio units (RUs) 70 by an optical distribution unit (ODU) 60.

In order to combine the O-RAN to the conventional DAS, there may be a solution to receive an RF signal generated through central unit (CU)-distribution unit (DU) and RU that is an O-RAN-based base station, but such a configuration is different from the open architecture and standardized interface of the O-RAN concept, and the cost is raised due to the configuration. Therefore, there is a need for a structure that can simultaneously service multi-frequency band and multi-carrier by accommodating a function of O-RAN RU in the DAS by utilizing a split standard between DU-RU and simultaneously accommodating a plurality of O-RAN RUs in the form of CU-DU-RU which is the O-RAN-based base station.

PRIOR ART DOCUMENT

Patent Literatures

1. Korean Patent Application No. 10-2018-0061358 (Wireless beamforming device that minimizes power loss in millimeter wave band)
2. U.S. Pat. No. 10,701,755 (Wireless communications using virtualized base stations network).

SUMMARY

Although the existing DAS uses an RF signal or a digital common public radio interface (CPRI) method to exchange signals with a base station, there is a need for a structure that can service multi-frequency band and multi-carrier by accommodating a function of O-RAN RU in the DAS by utilizing a split standard between DU-RU from the form of CU-DU-RU which is an O-RAN-based base station. Furthermore, there is a need for a structure that can accommodate a plurality of O-RAN RUs to provide service for multi-carrier and multi service provider, which is not the structure that only provide a service for a specific frequency or a specific carrier between DU-RU.

It is possible to directly install the O-RAN-based RU in a distributed region without through the DAS, but the product price increases because a function of a complex O-RAN interface and a function of a low physical layer exist in all RUs. Therefore, the present disclosure is directed to providing a distributed antenna system (DAS) for multi-carrier and multi-frequency band based on an open radio access network (O-RAN) standard in which an O-RAN remote unit (RU) function is combined to the DAS.

The problems to be solved of the present disclosure are not limited to the description mentioned above, and other technical problems that are not mentioned will be clearly understood by those skilled in the art from the following description.

In one aspect of the present disclosure, there is provided a distributed antenna system (DAS) for multi-carrier and multi-frequency band based on an O-RAN standard in an open radio access network (O-RAN)-based mobile communication network, the DAS including an O-RAN remote unit (RU) connected to a fronthaul network according to an O-RAN split option specification of base station transceiver systems (BTSs), and including a plurality of O-RAN RUs to accommodate a plurality of carriers and a plurality of frequency bands; and a channel combiner to which outputs of the plurality of O-RAN RUs are combined.

The O-RAN RU may include an O-RAN interface configured to communicate with the fronthaul network and meet the O-RAN split option specification; a low physical layer configured to process a signal of the O-RAN interface; an analog-to-digital converter (ADC) and digital-to-analog converter (DAC) corresponding to a form of the channel combiner; and an up/down converter (UDC) configured to convert a converted signal into radio frequency (RF).

The O-RAN interface may be an Ethernet or optical interface.

The channel combiner may be at least one of an analog combiner and a digital combiner.

The channel combiner may be the analog combiner, and the DAS may further include a POI interface for connection by an analog RF signal.

The channel combiner may be the digital combiner, and the DAS may further include a digital common public radio interface (CPRI)/open base station initiative (OBSAI) interface.

The channel combiner may be the analog combiner, and the DAS may further include an optical distribution unit (ODU) connected to the analog combiner; and a radio unit (RU) connected to the ODU, and the RU may further include an optical receiving unit (ORU) configured to receive an optical signal from the ODU; a high power amplifier (HPA) configured to process the received optical signal; a low noise amplifier (LNA) configured to process the received optical signal; and a duplexer or filter configured to transmit an output of the HPA and an output of the LNA as radio waves.

An output signal of the analog combiner may be a signal equal to or less than 6 GHz.

The channel combiner may be the analog combiner, and the DAS may further include an ODU connected to the analog combiner; and a millimeter wave RU connected to the ODU, and the millimeter wave RU may include an ORU configured to receive an optical signal from the ODU; an IF-RF converter configured to convert an output of the ORU into an intermediate frequency (IF) and then convert the IF into RF; an RF-millimeter wave converter configured to receive the RF; an array antenna interface connected to the RF-millimeter wave converter; and an array antenna connected to the array antenna interface to perform broadband transmission.

The RF may be equal to or greater than 6 GHz.

The millimeter wave frequency may accommodate multi-frequency.

According to the present disclosure, it is possible to accommodate a plurality of O-RAN RUs of the O-RAN standard limited to a specific frequency in a specific frequency band and a specific carrier in one system, and thus the O-RAN RU may be efficiently used for the DAS for multi-frequency band and multi-carrier.

In addition, it is possible to effectively build an O-RAN infrastructure without adding a function of a complex O-RAN interface and a function of the low physical layer for each of the plurality of O-RAN RUs that are installed in a distributed manner, and thus the O-RAN RU is technically simple, and in terms of cost, may be implemented and operated at a low cost.

In addition, when accessing a network in which the O-RAN DU-RU split option is changed, the interface needs to be changed. In this case, only the function of the O-RAN RU needs to be changed, and thus only the O-RAN interface needs to be changed without a great burden on the system change.

In addition, there is an advantage of accommodating various technologies such as POI which is responsible for transmitting and receiving the conventional analog RF signal and a method of receiving the digital signal together in the location of the O-RAN RU.

The effects of the present disclosure are not limited to the description mentioned above, and other effects not mentioned will be clearly understood by those skilled in the art from the following description.

BRIEF DESCRIPTION OF DRAWINGS

The following drawings attached to the specification illustrate preferred embodiments of the present disclosure, and serve to further understand the technical spirit of the present disclosure together with the detailed description of the present disclosure to be described later, so that the present disclosure should not be construed as being limited only to the matters described in such drawings.

DETAILED DESCRIPTION

Figure 1:
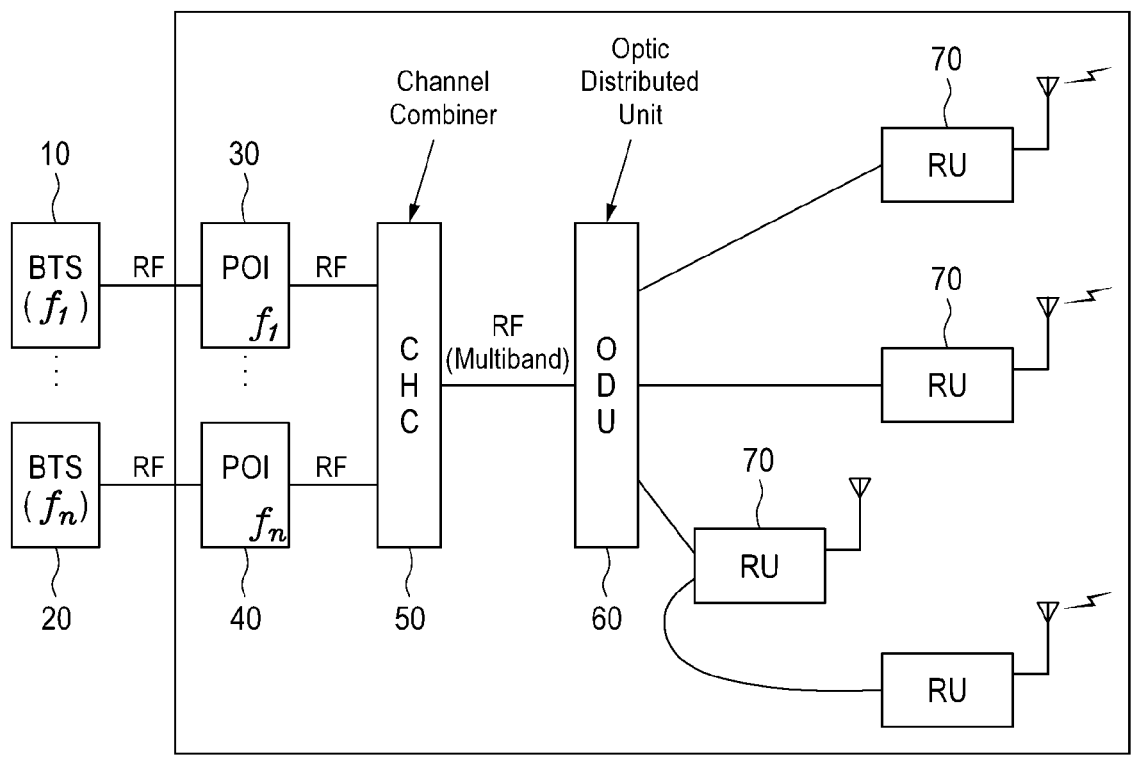
FIG. 1 is a schematic block diagram of a conventional distributed antenna system (DAS)

Hereinafter, with reference to the accompanying drawings, the embodiments of the present disclosure will be described in detail so that those skilled in the art may easily implement the embodiments. However, since the description of the present disclosure is merely an embodiment for structural or functional description, the scope of the present disclosure should not be construed as being limited by the embodiment described in the specification. That is, since the embodiment may have various changes and forms, it should be understood that the scope of the present disclosure includes equivalents capable of realizing the technical idea. In addition, since the object or effect presented in the present disclosure does not mean that a specific embodiment should include all of them or only such effects, the scope of the present invention should not be construed as being limited thereby.

The terms described in the present disclosure should be understood as follows.

Terms such as "first" and "second" are for distinguishing one element from another, and the scope of rights should not be limited by these terms. For example, a first element may be referred to as a second element, and similarly, a second element may also be referred to a first element. When an element is referred to as being "connected" to another element, it may be directly connected to the other element, but it should be understood that other elements may exist therebetween, whereas, when it is mentioned that a certain element is "directly connected" to another element, it should be understood that the other element does not exist therebetween. Meanwhile, other expressions describing the relationship between elements, that is, "between" and "directly between" or "adjacent to" and "directly adjacent to", etc., should be interpreted similarly.

As used herein, the singular forms also are intended to include the plural forms as well, unless the context clearly indicates otherwise. It will be further understood that the terms "comprises" and/or "comprising," when used in this specification, specify the presence of stated elements, steps, operations, and/or components, but do not preclude the presence or addition of one or more other elements, steps, operations, and/or components.

All terms used herein have the same meaning as commonly understood by those skilled in the art, unless otherwise defined. Terms defined in general used in the dictionary should be interpreted as having the meaning consistent with the context of the related art, and cannot be interpreted as having an ideal or excessively formal meaning unless explicitly defined in the present disclosure.

Hereinafter, embodiments of the present disclosure will be described in detail with reference to the accompanying drawings.

An O-RAN RU 200 is provided between an O-RAN-based mobile communication base station fronthaul network 100 and a channel combiner 120, and is capable of processing the O-RAN-based split 7.2X standard. The O-RAN RU 200 is configured to communicate with the fronthaul network 100, and basically includes an O-RAN interface 210 of the O-RAN split 7.2X standard and a low physical layer Low-PHY 212 for processing a signal of the O-RAN interface 210. Here, there may be methods of combining multi-frequency band and multi-carrier signal into an analog RF signal and into a digital baseband IQ signal according to a form of the DAS in a channel combiner.

In the case of the analog channel combining method, the multi-frequency band and the multi-carrier signal may be bundled by outputting an RF signal through an analog-to-digital converter (ADC) and a digital-to-analog converter (DAC) after the low physical layer 212 and an RF transceiver that converts a converted analog signal by radio frequency (RF) and connecting the RF signal with a channel combiner, or, in the case of a millimeter wave frequency band, converting the converted analog signal by an intermediate frequency (IF) and then connecting the IF signal to the channel combiner.

In the case of the digital method, digital baseband I/Q signals extracted from a plurality of O-RAN RUs 200 and low physical layers 212 may be mapped by a TDM method and processed in a bundle.

Figure 2A:
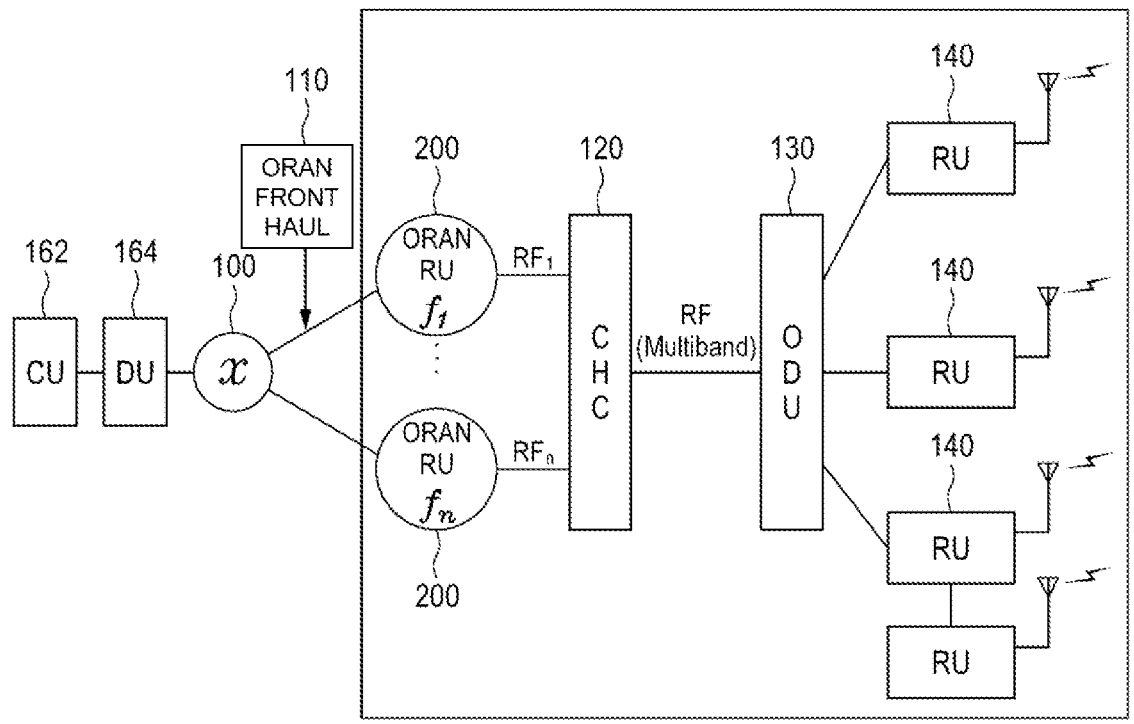
FIG. 2A is a schematic block diagram of a distributed antenna system (DAS) connected to a channel combiner by an analog RF signal by applying a function of an O-RAN-based remote unit (RU) according to an embodiment of the present disclosure.

FIG. 2A is a schematic block diagram of a distributed antenna system (DAS) connected to a channel combiner CHC by an analog RF signal by applying a function of an O-RAN-based remote unit (RU) according to an embodiment of the present disclosure. As shown in FIG. 2A, a CU 162 and a DU 164 are connected to the fronthaul network 100. A signal of the fronthaul network 100 is split and input to each of the plurality of O-RAN RUs 200 for each of frequencies $f_1, f_2, \ldots, f_n$ according to an O-RAN fronthaul 110 based on an O-RAN split specification. The plurality of O-RAN RUs 200 are connected in parallel to the fronthaul network 100 according to the frequencies $f_1, f_2, \ldots f_n$. The plurality of O-RAN RUs 200 are respectively converted into analog RF signals according to allocated frequencies $f_1, f_2, \ldots, f_n$, and connected to the channel combiner CHC 120. The channel combiner 120 is connected to an optical distribution unit (ODU) 130. A plurality of radio units (RUs) 140 are connected to the ODU 130.

Figure 2B:
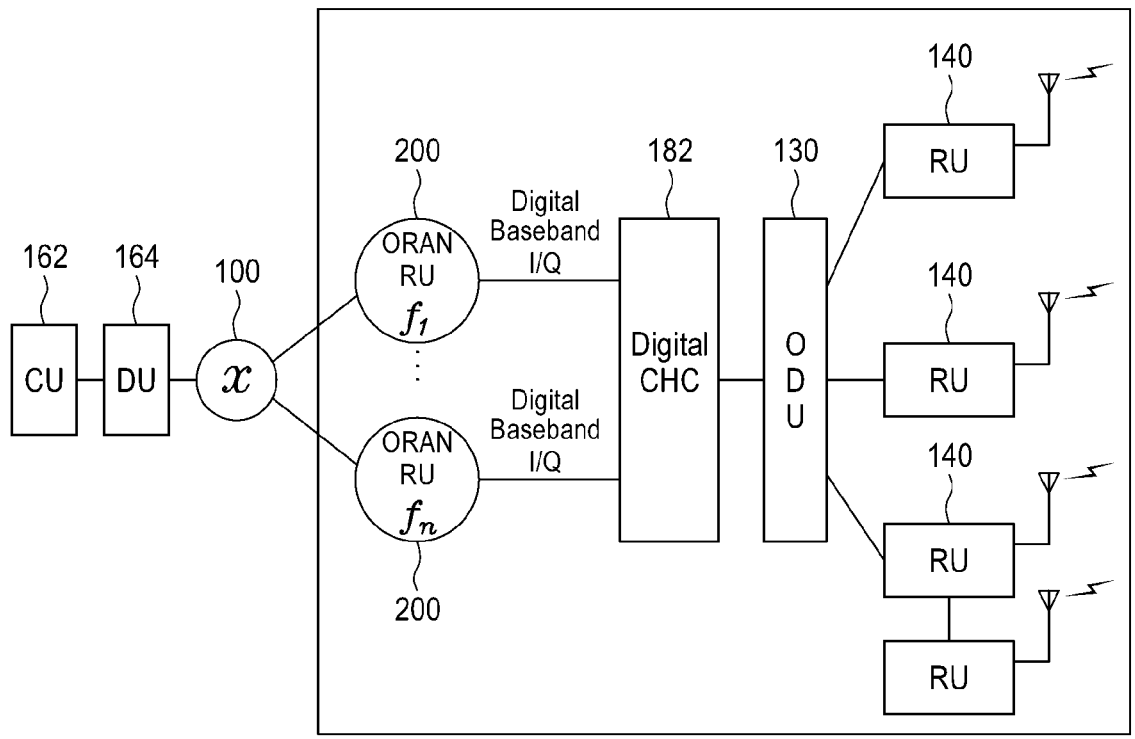
FIG. 2B is a schematic block diagram of a DAS connected to a digital channel combiner by a digital baseband I/Q signal by applying a function of an O-RAN-based RU according to an embodiment of the present disclosure.

FIG. 2B is a schematic block diagram of a DAS connected to a digital channel combiner 182 by a digital baseband I/Q signal by applying a function of an O-RAN-based RU according to an embodiment of the present disclosure. That is, FIG. 2B shows the DAS connected to the digital channel combiner 182 by the digital baseband I/Q signal.

Figure 2C:
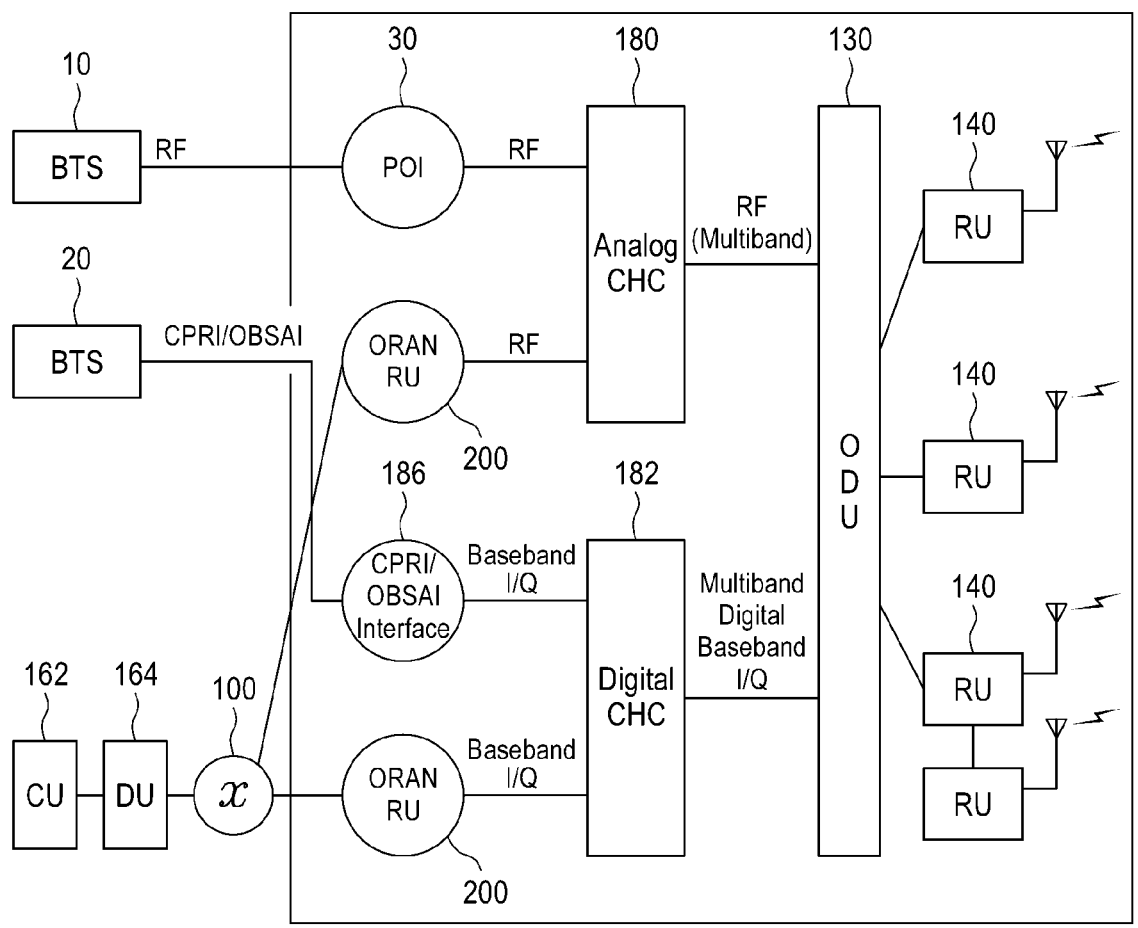
FIG. 2C is a schematic block diagram of a DAS according to another embodiment of the present disclosure.

FIG. 2C is a schematic block diagram of a DAS according to another embodiment of the present disclosure. As shown in FIG. 2C, the DAS may be connected to the analog channel combiner 180 by an analog RF signal through various technologies, i.e., the POI 30 like the conventional technology, with respect to a connection method between the base station transceiver systems (BTSs) 10 and 20 and the DAS.

Alternatively, the DAS may be connected to the digital channel combiner 182 by the digital baseband I/Q signal digitally or by applying a method according to the O-RAN-based split option through a common public radio interface (CPRI) or an open base station initiative (OBSAI) interface 186. Selectively, as shown in FIG. 2C, the DAS may be connected to the ODU 130 in a method in which the analog method and the digital method described above are flexibly mixed.

Figure 3:
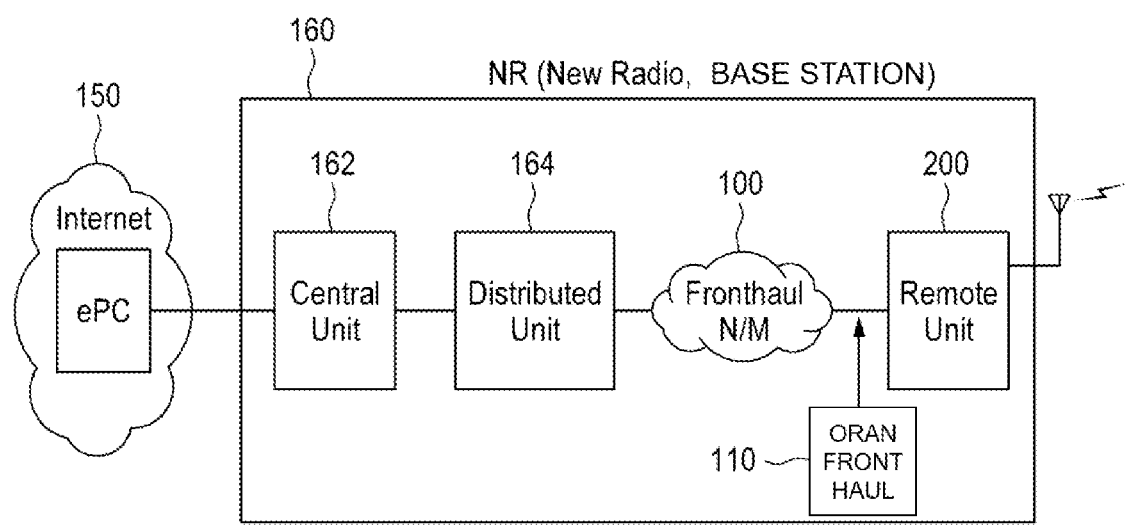
FIG. 3 is a schematic block diagram of an O-RAN-based mobile communication access network.

FIG. 3 is a schematic block diagram of a new radio (NR) base station 160 including the O-RAN RU 200 according to the present disclosure. As shown in FIG. 3, the NR base station 160 is connected to an external Internet 150. Inside the NR base station 160, the CU 162 and the DU 164 connected to the Internet 150, the fronthaul network 100, and the RU 200 are connected in series. The O-RAN fronthaul 110 is applied to a signal transmitted between the fronthaul network 100 and the O-RAN RU 200.

Figure 4:
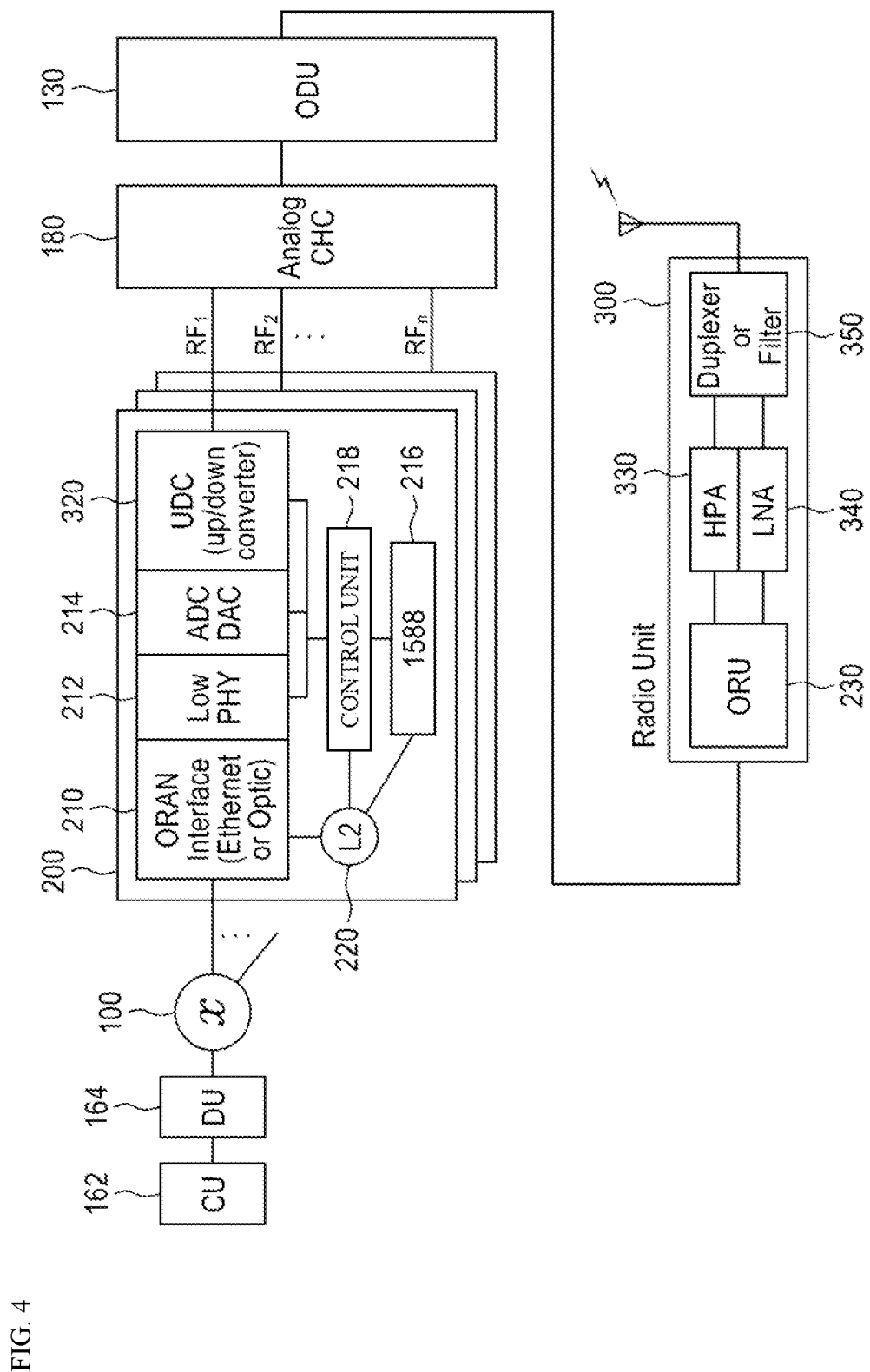
FIG. 4 is a schematic block diagram of a DAS applicable to equal to or less than 6 GHz according to an embodiment of the present disclosure.

FIG. 4 is a schematic block diagram of the O-RAN RU 200 applicable to equal to or less than 6 GHz according to an embodiment of the present disclosure. As shown in FIG. 4, the O-RAN RU 200 includes a control unit 218, an L2 switch 220, the O-RAN interface 210, the low physical layer Low PHY 212, an ADC and DAC 214, an IEEE-1588 clock 216, and an up/down converter (UDC) 320. As the O-RAN interface 210, an Ethernet interface or an optical interface may be used. The O-RAN interface 210 is connected to an Ethernet L2 switch for communication with internal processors, and includes FPGA hardware to accommodate the low physical layer Low PHY 212.

The low physical layer 212 is configured to process an output signal of the O-RAN interface 210. In addition, the ADC and DAC 214 connected to the low physical layer 212 are provided. The DAC outputs an input digital signal as a converted analog signal.

As a method of converting the converted analog signal into radio frequency (RF), one of two methods may be applied. The first method is a method of directly converting an analog signal converted by an RF transceiver into RF (direct conversion method). The second method is a method of converting the converted analog signal into an intermediate frequency (IF) and then converting the IF back into RF (superheterodyne method). To this end, the DAC outputs IF equal to or less than 4 GHz.

And, the IEEE-1588 clock 216 is included as an element. The IEEE-1588 clock 216 is used for a synchronization operation of the O-RAN RU 200.

The RF signal generated by the UDC 320 is transmitted to a radio unit (RU) 300 located at a long distance through the analog channel combiner 180 and the ODU 130, and an optical receiving unit (ORU) 230 receives an optical signal inside the RU 300. The received signal is converted into an electrical RF signal and includes a high power amplifier (HPA) 330 and a low noise amplifier (LNA) 340. Thereafter, radio waves are transmitted and received by a duplexer or filter 350.

Figure 5:
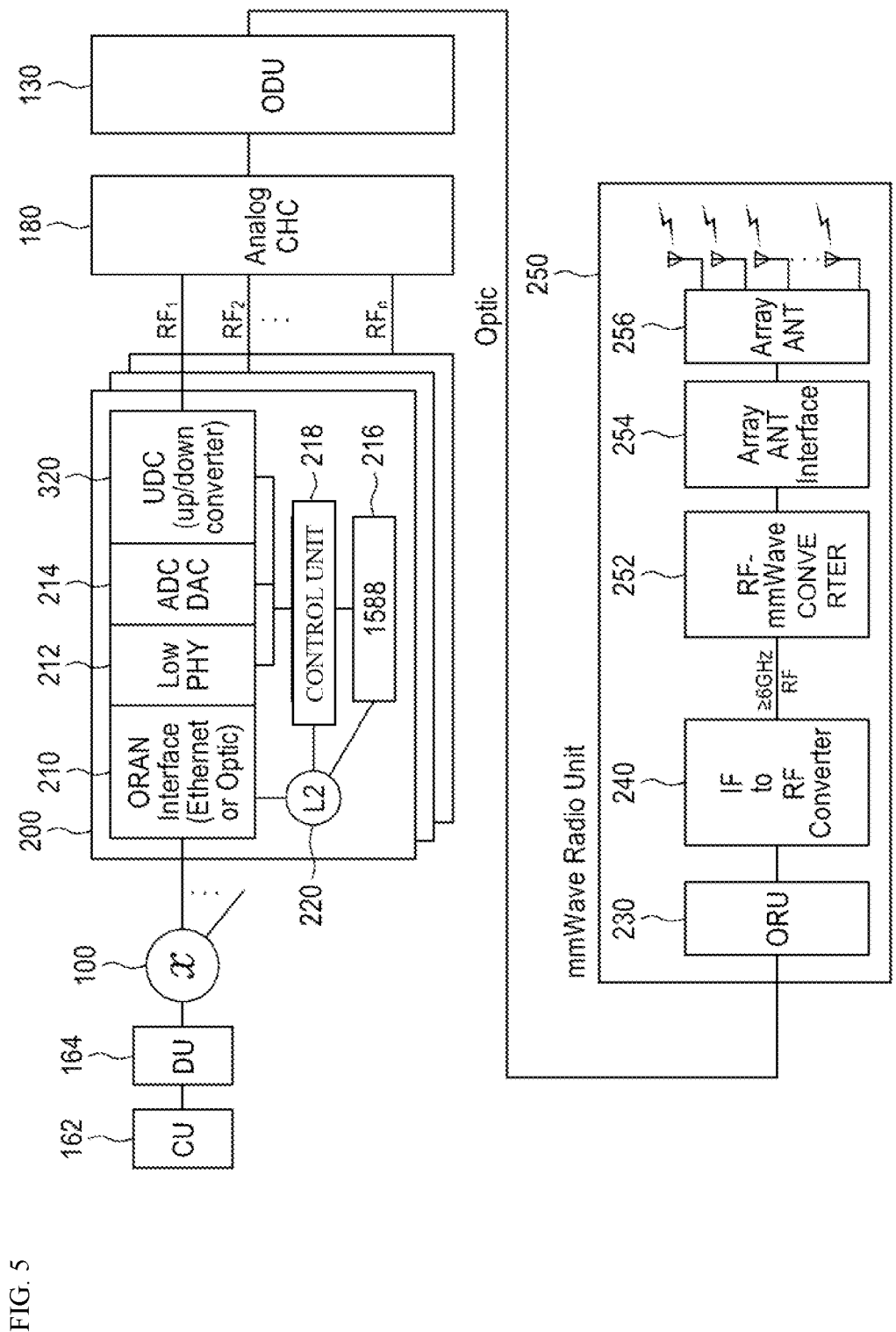
FIG. 5 is a schematic block diagram of a DAS applicable to a millimeter wave according to an embodiment of the present disclosure.

FIG. 5 is a schematic block diagram of the O-RAN RU 200 applicable to a millimeter wave (mmWAVE) according to an embodiment of the present disclosure. As shown in FIG. 5, the internal configuration of the O-RAN RU 200 is the same as that of the O-RAN RU 200 of FIG. 4.

The ORU 230, an IF-RF converter 240, an RF-millimeter wave converter 252, an array antenna interface 254, and an array antenna 256 are provided inside a millimeter wave radio unit (RU) 250.

The IF-RF converter 240 converts IF into RF equal to or greater than 6 GHz and transmits the RF to the RF-millimeter wave converter 252.

The RF-millimeter wave converter 252 is a transceiver capable of transmitting and receiving RF in millimeter wave (e.g., 28 GHz or 39 GHz).

The array antenna interface 254 is connected between the RF-millimeter wave converter 252 and the array antenna 256. The array antenna interface 254 performs a beam steering technology and a beam forming technology. Beam steering is a technology that branches an RF signal, which is a signal source, to several antennas, and forms a beam that meets the conditions by adjusting the phase and signal amplitude (gain) for each antenna. Beam forming is a technology that forms a beam only in the direction of a subscriber among a plurality of users. A plurality of array antenna interface modules are used for the array antenna interface 254 for beam steering or beam forming of millimeter wave.

The array antenna 256 performs broadband transmission of RF.

The detailed description of the preferred embodiments of the present disclosure as described above is provided to enable those skilled in the art to make and practice the present disclosure. Although the above has been described with reference to preferred embodiments of the present disclosure, it will be understood by those skilled in the art that various modifications and changes may be made to the present disclosure without departing from the scope of the present disclosure. For example, those skilled in the art may use each of configurations described in the embodiments described above by combining the configurations with each other. Accordingly, the present disclosure is not intended to be limited to the embodiments presented herein but is to have the widest scope consistent with the principles and novel features disclosed herein.

The present disclosure may be embodied in other specific forms without departing from the spirit and essential characteristics of the present disclosure. Accordingly, the above detailed description should not be construed as restrictive in all respects but as exemplary. The scope of the present disclosure should be determined by a reasonable interpretation of the appended claims, and all modifications within the equivalent scope of the present disclosure belong to the scope of the present disclosure. The present disclosure is not intended to be limited to the embodiments presented herein but is to have the widest scope consistent with the principles and novel features disclosed herein. In addition, the claims that are not explicitly cited in the claims may be combined to form an embodiment or may be included as new claims by amendment after the filing of the present disclosure.

What is claimed is:

1. A distributed antenna system (DAS) for multi-carrier and multi-frequency band based on an O-RAN standard in an open radio access network (O-RAN)-based mobile communication network, the DAS comprising:
   an O-RAN remote unit (RU) connected to a fronthaul network according to an O-RAN split option specification of base station transceiver systems (BTSs), and comprising a plurality of O-RAN RUs to accommodate a plurality of carriers and a plurality of frequency bands;
   a POI interface for connection by an analog RF signal and connected to one or more of the BTSs;
   a digital common public radio interface (CPRI)/open base station initiative (OBSAI) interface connected to one or more of the BTSs;
   an analog channel combiner configured to combine analog RF signals output from the POI interface and one or more of the plurality of O-RAN RUs; and
   a digital channel combiner configured to combine baseband I/Q signals output from the CPRI/OBSAI interface and one or more of the plurality of O-RAN RUs,
   wherein
   the DAS further comprising:
   an optical distribution unit (ODU) connected to the analog channel combiner; and
   a radio unit (RU) connected to the ODU, and
   wherein the RU comprises:
   an optical receiving unit (ORU) configured to receive an optical signal from the ODU and convert the optical signal into an electrical RF signal;
   a high power amplifier (HPA) configured to process the electrical RF signal;
   a low noise amplifier (LNA) configured to process the electrical RF signal; and
   a duplexer or filter configured to transmit an output of the HPA and an output of the LNA as radio waves.

2. The DAS of claim 1, wherein the O-RAN RU comprises:
   an O-RAN interface configured to communicate with the fronthaul network and meet the O-RAN split option specification;
   a low physical layer configured to process a signal of the O-RAN interface;
   an analog-to-digital converter (ADC) and digital-to-analog converter (DAC) corresponding to a form of the channel combiner; and
   an up/down converter (UDC) configured to convert a converted signal into radio frequency (RF).

3. The DAS of claim 2, wherein the O-RAN interface is an Ethernet or optical interface.

4. The DAS of claim 1, wherein an output signal of the analog channel combiner is a signal equal to or less than 6 GHz.

* * * * *